United States Patent [19]
Shiiyama

[11] Patent Number: 6,128,616
[45] Date of Patent: Oct. 3, 2000

[54] DOCUMENT MANAGEMENT SYSTEM USING AN ACCESS-LIMITED CHARACTER TRAIN AND PASSWORD, AND METHOD AND COMPUTER-READABLE MEDIUM THEREFOR

[75] Inventor: Hirotaka Shiiyama, Machida, Japan

[73] Assignee: Canon Kabushiki Kaisha, Tokyo, Japan

[21] Appl. No.: 08/995,899

[22] Filed: Dec. 22, 1997

[30] Foreign Application Priority Data

Dec. 27, 1996 [JP] Japan ..................................... 8-358607

[51] Int. Cl.[7] ...................................................... G06F 17/30
[52] U.S. Cl. ................................ 707/10; 707/6; 709/217; 713/202
[58] Field of Search ............................. 707/10, 501, 513, 707/5, 6; 709/217, 218, 219; 713/200–202

[56] References Cited

U.S. PATENT DOCUMENTS

| | | | |
|---|---|---|---|
| 4,760,606 | 7/1988 | Lesnick et al. | 382/48 |
| 5,481,672 | 1/1996 | Okuno et al. | 713/202 |
| 5,598,536 | 8/1994 | Slaughter, III et al. | 395/200.16 |
| 5,778,367 | 7/1998 | Wesinger, Jr. et al. | 707/10 |
| 5,826,014 | 10/1998 | Coley et al. | 395/187.01 |

FOREIGN PATENT DOCUMENTS 8-7033  1/1996  Japan .

*Primary Examiner*—Hosain T. Alam
*Attorney, Agent, or Firm*—Fitzpatrick, Cella, Harper & Scinto

[57] ABSTRACT

A document management system which can flexibly cope with an access right range of a secret document while efficiently sharing document data is provided. The document management system has a data server, a full-text search service server connected to the LAN, and a fire wall arranged between the full-text search service server and the data server. When the user wants to refer to document/document image data accumulated in the data server, a client terminal designates a character train included in the document/document image data to be referred to, thereby performing the searching process. When the user wants to designate an access-limited character train as a search word, a password for the access-limited character train is simultaneously designated. When the access-limited character train and the password are not designated, the document including the access-limited character train is not displayed as a search result but is seen as if the document including the access-limited character train does not exist.

34 Claims, 10 Drawing Sheets

FIG. 4A

| DELETION START THRESHOLD |
|---|
| 3 |

FIG. 4B

| ACCESS-LIMITED CHARACTER TRAIN | PASSWORD | NO. OF DELETION REQUESTS | IP ADDRESS OF REGISTRATION REQUESTER | IP ADDRESS OF DELETION REQUESTER (VARIABLE LENGTH) |
|---|---|---|---|---|
| EXAM 96 | LION | 0 | 150.61,100.81 | |
| ZX-620 | DRAGON | 1 | 150.61,100.91 | 150.61,100.81 |
| | | | | 150.61, |

DOCUMENT MANAGEMENT SYSTEM USING AN ACCESS-LIMITED CHARACTER TRAIN AND PASSWORD, AND METHOD AND COMPUTER-READABLE MEDIUM THEREFOR

BACKGROUND OF THE INVENTION

1. Field of the Invention

The invention relates to a document management system and its method.

2. Related Background Art

Hitherto, a document management system has been realized by forming a fire wall against the outside. Internal security is protected by means for enciphering data.

In case of managing document data having high secrecy in a sharing system, document management is performed on a group unit basis in which an accessing right has previously been limited or the accessing right or a key word is individually given to each document.

In the former case, however, an efficient sharing of document data is obstructed. In the latter case, it lacks flexibility of an accessing right range of a secret document, or secrecy is lost and it is impossible to flexibly cope with the operation when the document data is publicly disclosed.

It is, therefore, an object of the invention to provide a document management system which can flexibly cope with an accessing right range of a secret document while efficiently sharing document data.

Another object of the invention is to provide a document management system which can flexibly cope with the operation when secrecy is lost and document data is publicly disclosed.

SUMMARY OF THE INVENTION

According to an embodiment of the invention, there is provided a document management system comprising: a document search service server connected to a client terminal through a network; and a data server, connected to the network through the document search service server, for accumulating documents, in which the document search service server searches the documents accumulated in the data server in accordance with a character train designated from the client terminal, wherein the document search service server has: setting means for setting an access-limited character train and its password; and inhibiting means for inhibiting an access to the document including the access-limited character train at the time of the search when the access-limited character train and its password are not designated from the client terminal.

BRIEF DESCRIPTION OF THE DRAWINGS

FIGS. 4A and 4B each show part of a diagram showing an access-limited character train management information table;

DETAILED DESCRIPTION OF THE PREFERRED EMBODIMENTS

Figure 1:
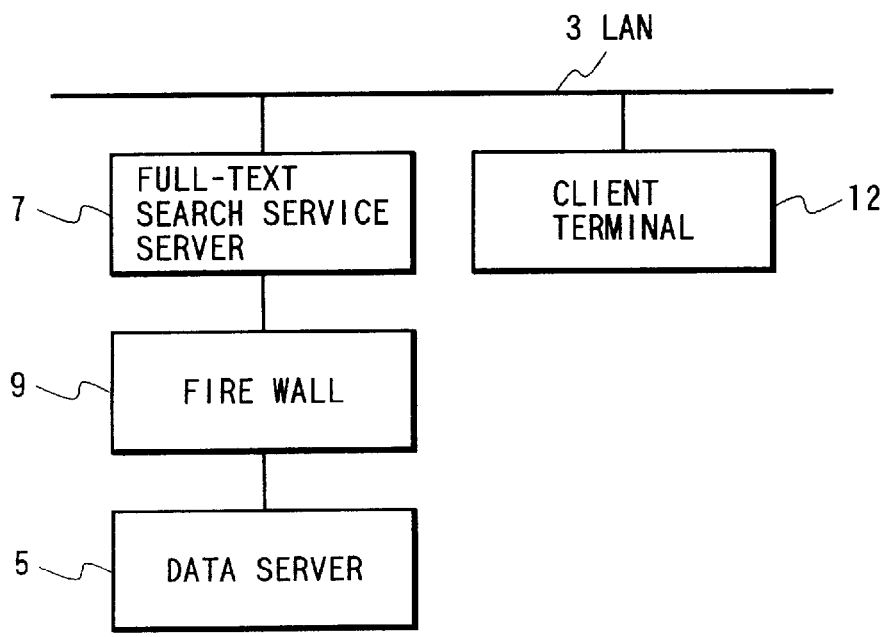
FIG. 1 is a block diagram showing a construction of a document management system according to an embodiment.

An embodiment of a document management system of the invention will now be described. FIG. 1 is a block diagram showing a construction of the document management system according to the embodiment.

The document management system comprises: a data server 5 for accumulating document data; a full-text search service (FTS) server 7 connected to an LAN 3; and a fire wall 9 arranged between the FTS server 7 and data server 5.

In such a document management system, since the FTS server 7 is provided on the outside of the fire wall 9, it is possible to access the FTS server 7 from any one of client terminals 12 connected to the LAN 3.

In the document management system, a file for search (full-text search index) and information of an access-limited character train/password are provided for the data server 5 existing on the inside of the fire wall 9.

In the FTS server 7, the full-text search service software operates and all of the data transmitting and receiving operations which are executed beyond the fire wall 9 are executed via the full-text search service software. The full-text search service software executes the access to the document text data (document) and the document image data accumulated in the data server 5.

As a full-text search system, any one of the character index system (refer to JP-A-8-7033) and the word index system can be used. However, since there is a possibility that the access-limited character train becomes a special language, it is preferable to use the character index system having no fear of search leakage.

Figure 2:
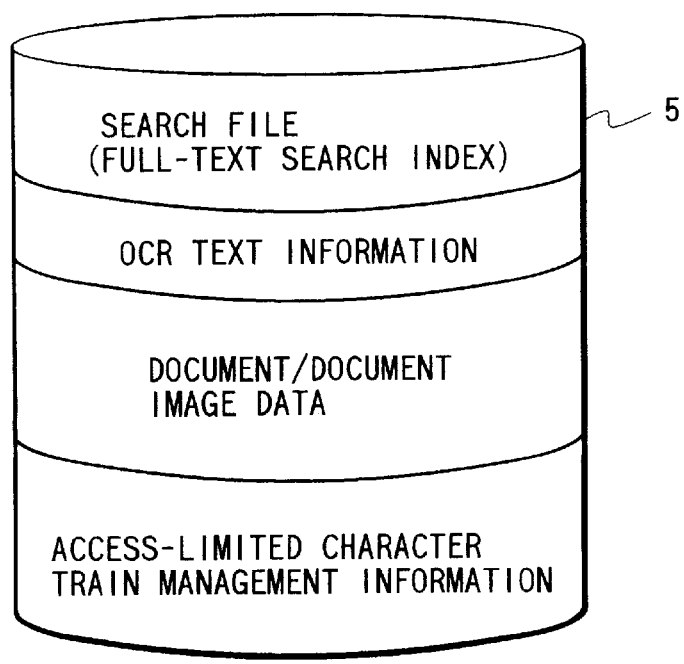
FIG. 2 is a diagram showing a construction of data managed in a data server 5.

FIG. 2 is a diagram showing a construction of data managed in the data server 5. Data such as file for search (full-text search index), OCR text information, document/document image data main body, access-limited character train management information, and the like has been stored in the data server 5.

When the user wants to refer to the document/document image data accumulated in the data server 5, he can refer to the document/document image data by designating a character train included in a document/document image. Although the designation of the character train included in the document is limited here to prevent the access to a secret document, the limited character train is called an access-limited character train.

Subsequently, (A) an access-limited character train registering process, (B) an access-limited character train deleting process, (C) a document/data registering process, and (D) a document/data searching process in the document management system will now be described.

(A) Access-limited character train registering process

Figure 3:
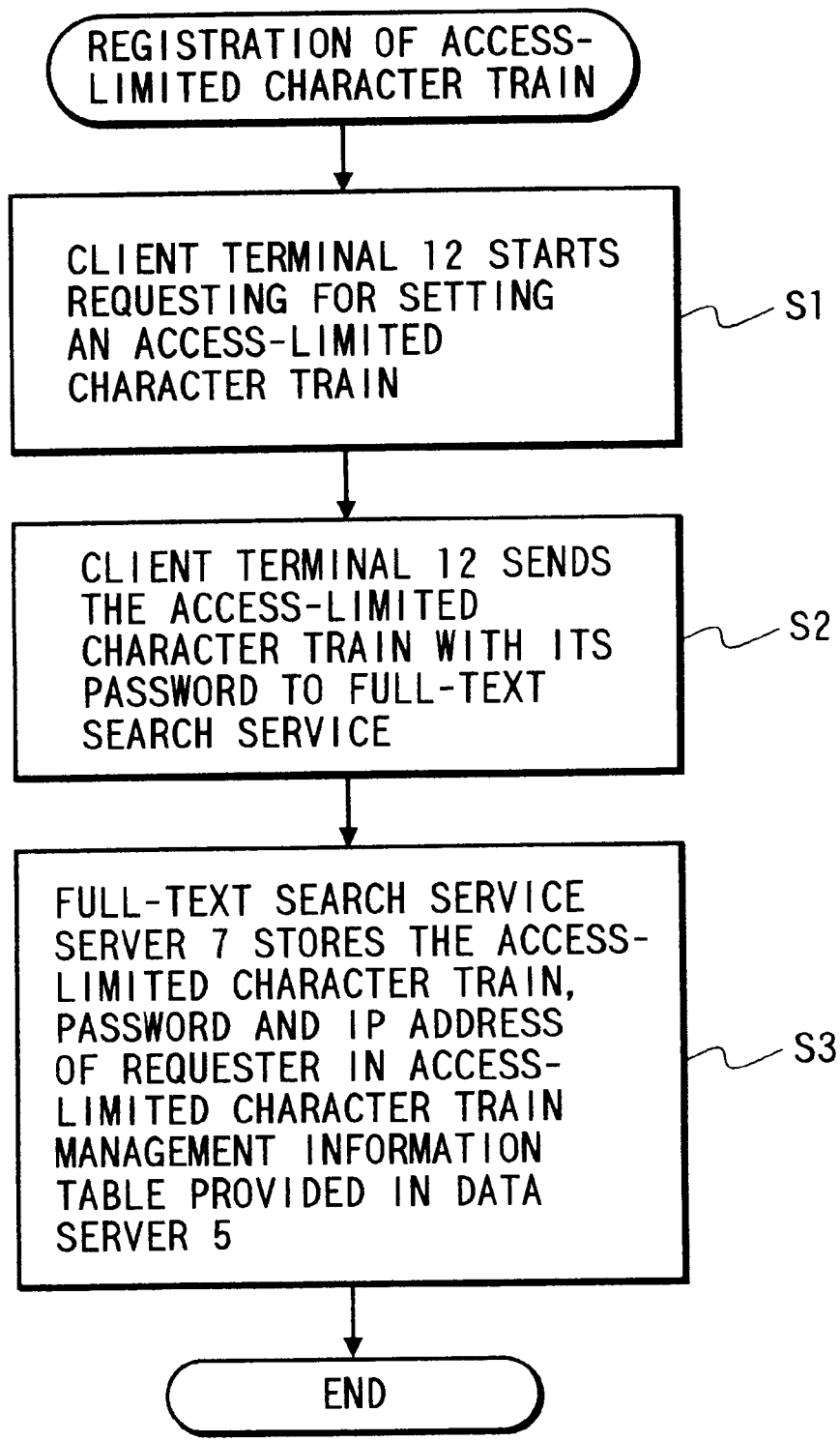
FIG. 3 is a flowchart showing a registration processing procedure of an access-limited character train.

FIG. 3 is a flowchart showing a registration processing procedure of the access-limited character train. When the user wants to designate the access-limited character train regarding a secret document, the client terminal 12 starts to request for setting the access-limited character train (step S1) and transmits the access-limited character train and a command to set a password for the access-limited character train to the full-text search service software (step S2). The full-text search service server 7 stores the access-limited character train and an IP address of a registration requester of the password into an access-limited character train management information table stored in the data server 5 (step S3).

FIGS. 4A and 4B each show part of a diagram showing the access-limited character train management information table. The access-limited character train, password, and IP address of the registration requester are written into the access-limited character train management information table by the full-text search service software. Since the access-limited character train management information table has been stored in the data server 5 behind the fire wall 9, security is assured.

The registration request of the access-limited character train generally should be performed before a document including secret items is registered and should be executed while consulting a system manager. A word which is ordinarily used is improper for the access-limited character train and it is desirable to use a word such as new word or word originally created. It is, therefore, considered to select any word which does not exist by comparing with a daily word dictionary.

(B) Access-limited character train deleting process

In the case where secrecy is lost and the user wants to disclose the document/document image data including a word of no secrecy, the client terminal 12 transmits an access-limited cancel request of the access-limited character train to the FTS server 7 and sends the access-limited character train and the password to the full-text search service software.

Figure 5:
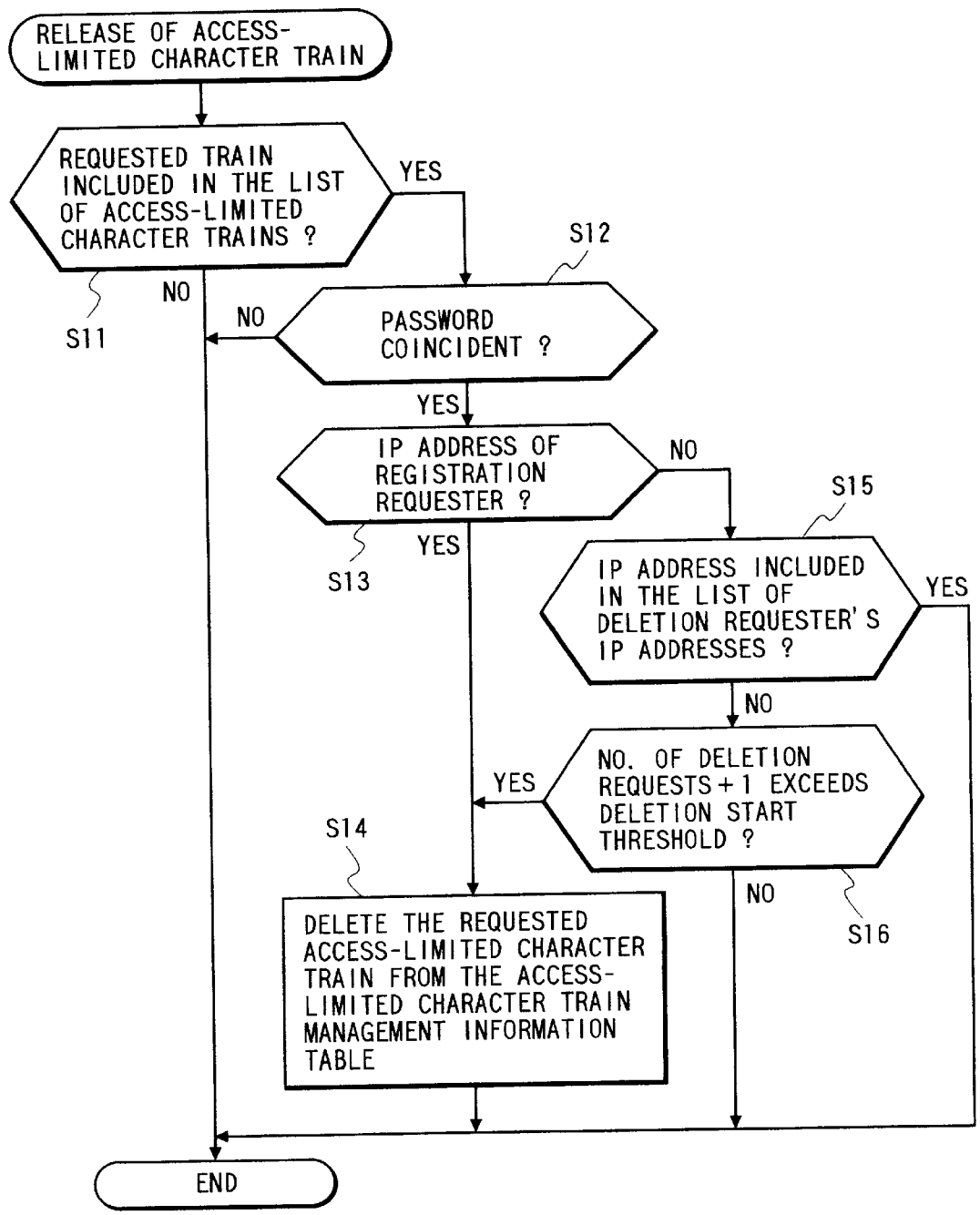
FIG. 5 is a flowchart showing a cancel processing procedure of the access-limited character train.

FIG. 5 is a flowchart showing the cancel processing procedure of the access-limited character train. A person who executed the registration request and has the IP address can delete the information for the access-limited character train in principle. First, a check is made to see if the deletion-requested character train exists in a list of access-limited character trains (step S11). When such a character train exists in the list of the access-limited character train, a check is made to see if the password coincides (step S12). When the password coincides, a check is made to see if it shows the IP address of the registration requester (step S13). When it shows the IP address of the registration requester, the access-limited character train is deleted from the access-limited character train management information table (step S14).

When the password does not indicate the IP address of the registration requester, a check is made to see if the deletion-requested character train exists in a list of the IP addresses of deletion requesters (step S15). If it does not exist in the list of the IP addresses of the deletion requesters, a check is made to see if the value of (the number of deletion requests +1) has exceeded a deletion start threshold value (value 3 in the embodiment) (step S16). When it exceeds the deletion start threshold value, step S14 follows and the access-limited character train is deleted from the access-limited character train management information table.

When the requested train is not included in the list of the access-limited character trains in step S11, when the password does not coincide in step S12, when the IP address is included in the list of the IP addresses of the deletion requesters in step S15, or when the number does not exceed the deletion start threshold value in step S16, the processing routine is finished as it is.

As mentioned above, as means for deleting by a person other than the registrant, the access-limited character train can be deleted only when there are a plurality of different deletion requests for safety. In this case, locations where the IP addresses of the deletion requesters who requested the deletion of the access-limited character train are stored are provided in the access-limited character train management information table of the data server 5. A function such that when a deletion request of the deletion start threshold value or more is sent from a different IP address for the same access-limited character train by the correct password, the deletion is permitted is provided for the data server 5.

(C) Registering process of the document/document image data

When the registration of the document/document image data is instructed from the client terminal 12 connected to the LAN 3, the document/document image data is stored into the data server 5 through the LAN 3 and the document address is determined by the full-text search service software which operates on the FTS server 7.

The full-text search service software decomposes the document (text data) into character keys and additionally records the decomposed character keys into a file for search (full-text search index) in which document addresses are described (refer to JP-A-8-7033).

In case of the document image data, the OCR process is executed, the text data obtained by the recognition is decomposed into character keys in a manner similar to the document (text data), and the decomposed character keys are additionally recorded to a file for search (full-text search index) in which document image addresses are described. In this instance, the text data obtained by the OCR process is stored in correspondence to the original document image data.

Figure 6:
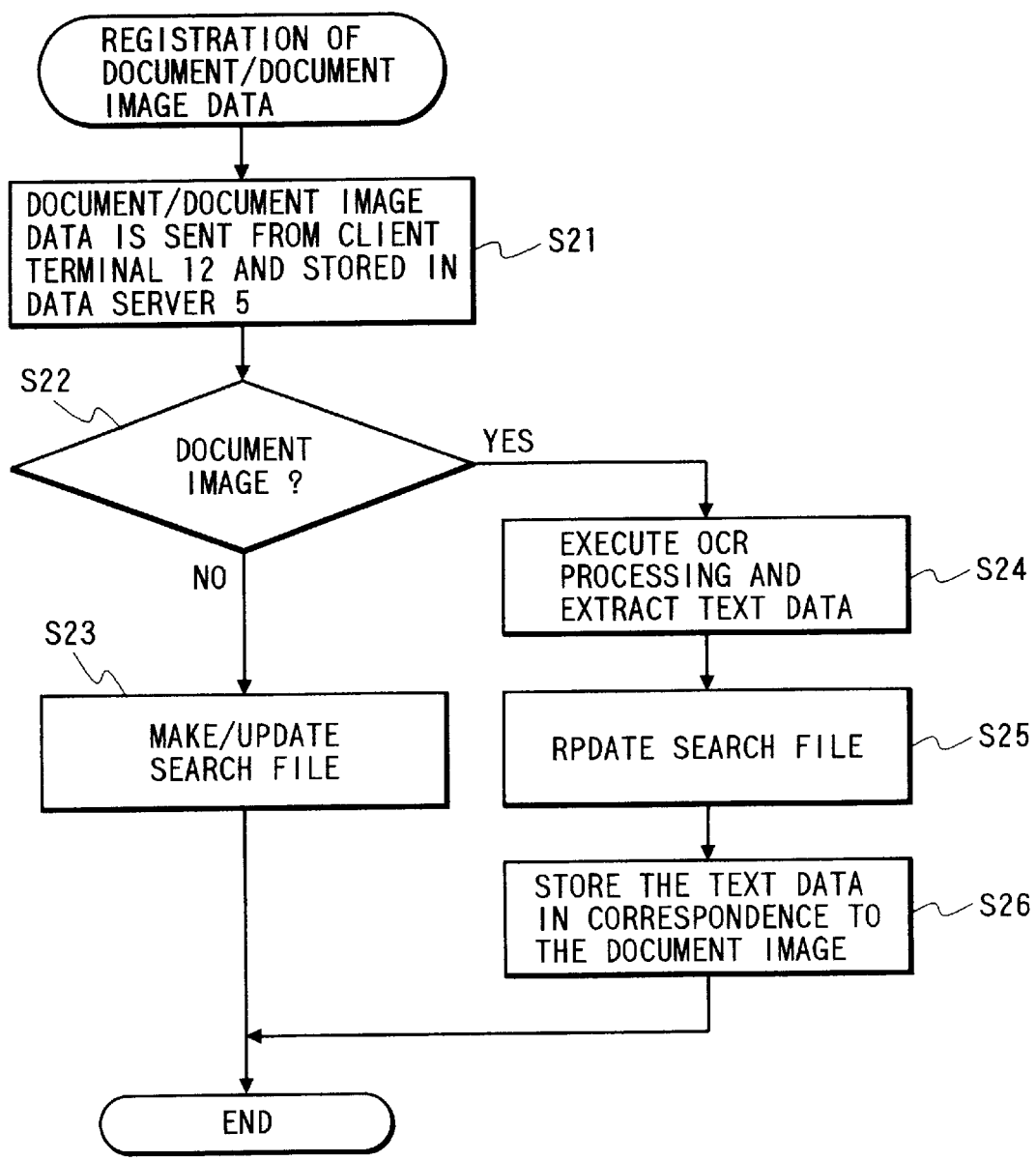
FIG. 6 is a flowchart showing a registration processing procedure of document/document image data.

FIG. 6 is a flowchart showing the registration processing procedure of the document/document image data. First, the document/document image data is transferred from the client terminal 12 and stored into the data server 5 (step S21). Whether the document image data has been stored or not is discriminated (step S22). When the stored data is not the document image data, a file for search (full-text search index) is formed (step S23). When it is the document image data, the OCR process is executed and the text data is extracted (step S24). The file for search is updated in consideration of the erroneous recognition of the OCR (step S25). The extracted text data is stored in correspondence to the original document image data (step S26).

(D) Document/data searching process

When the user wants to refer to the document/document image data accumulated in the data server 5, the client terminal 12 executes searching process by designating the character train included in the document/document image data to be referred to. The character train (search word) to be searched is decomposed into the character keys by the full-text search software and the document addresses of the document including all of the character keys are obtained. After that, the document data in which those decomposed keys are continuous is examined and specified. Thus, the searching process is executed at a high speed.

Figure 7:
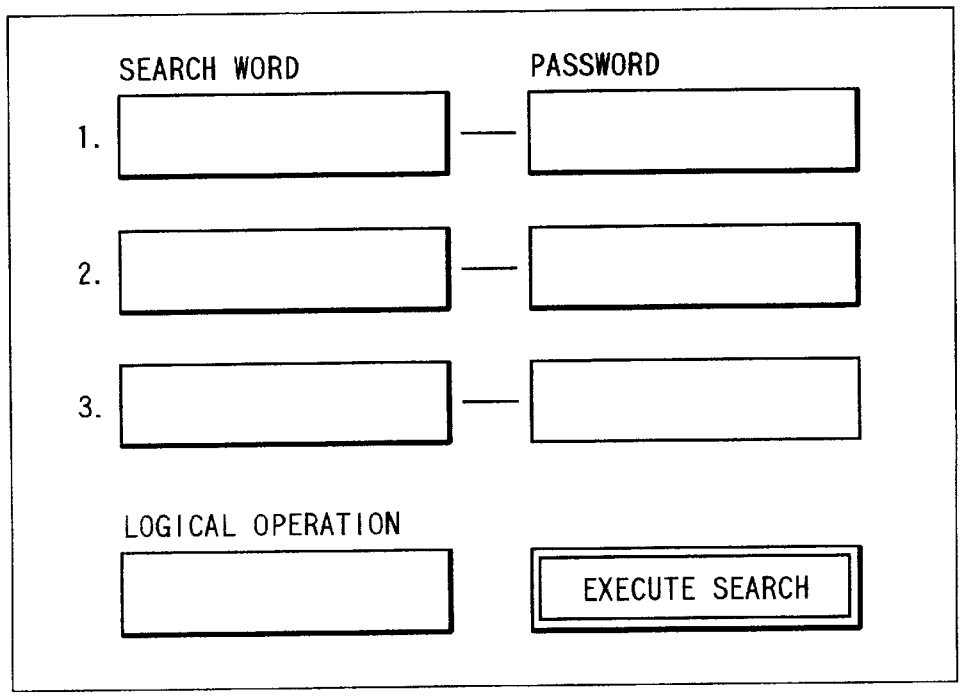
FIG. 7 is a diagram showing a search condition input picture plane at the time of the search.

When the user wants to designate the access-limited character train to the search word, the password for it is simultaneously designated. FIG. 7 is a diagram showing a search condition entering picture plane at the time of the search. If necessary, the password can be designated to the search word.

When the access-limited character train and its password are not designated, the document including the access-limited character train is not displayed as a search result, so that the document including the access-limited character train is seen as if it does not exist.

Figure 9:
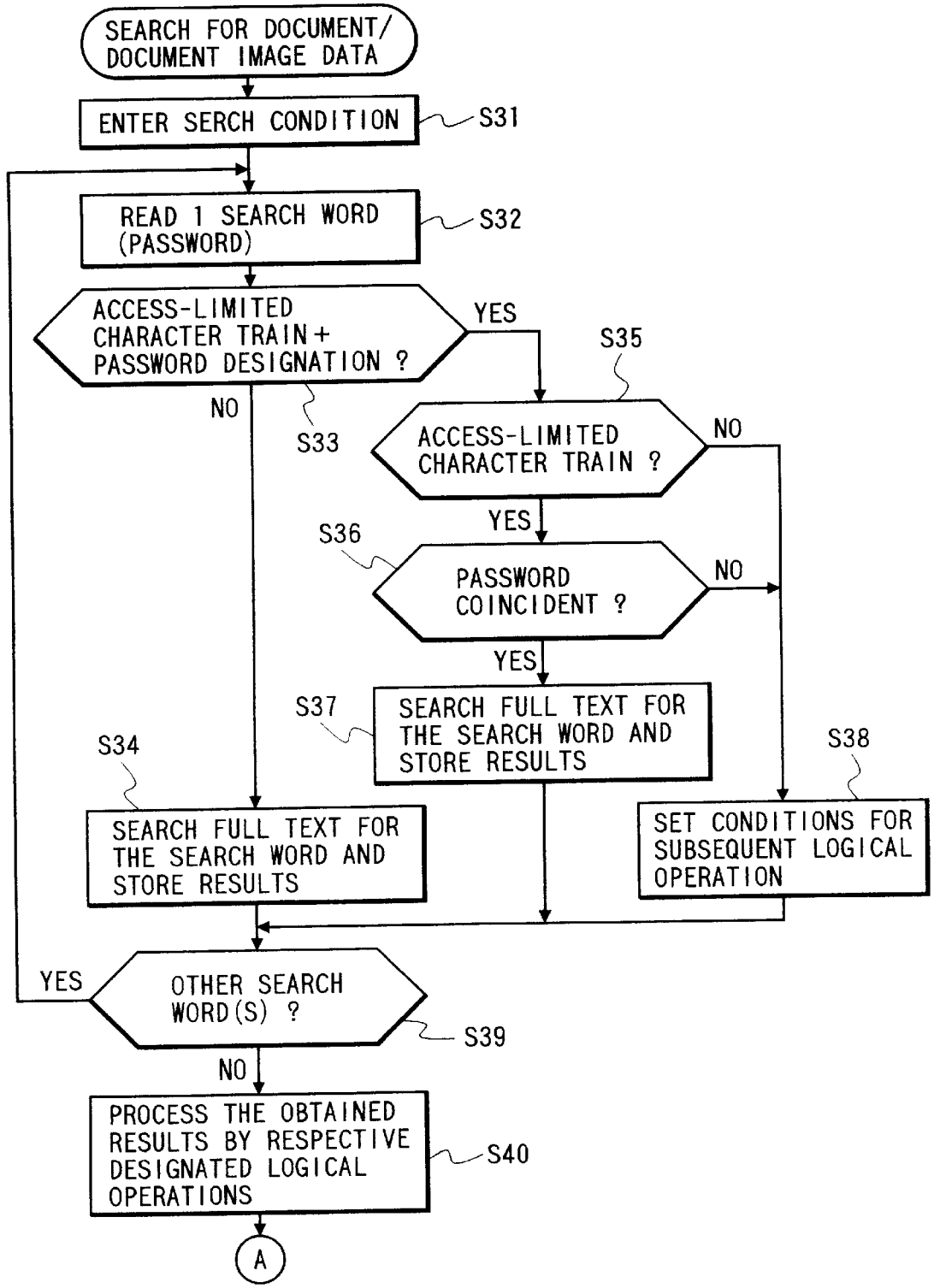
FIG. 9 is a flowchart showing a search processing procedure of the document/document image data.
Figure 10:
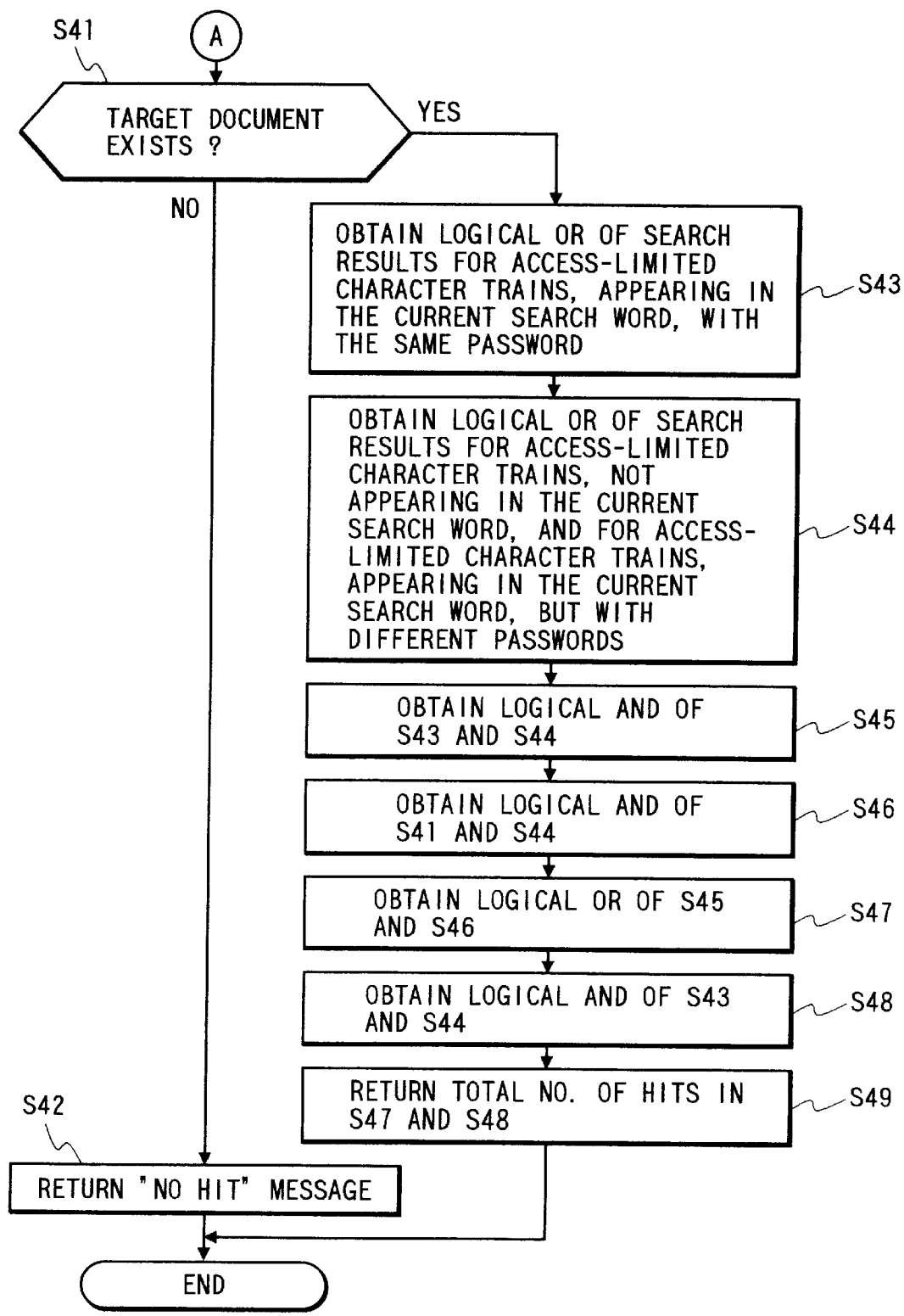
FIG. 10 is a flowchart showing the search processing procedure of the document/document image data subsequent to FIG. 9.

FIGS. 9 and 10 are flowcharts showing the search processing procedure of the document/document image data. When the password to the access-limited character train is not correct, an arithmetic operation of a portion corresponding to the access-limited character train is not performed from the search conditions which are designated, thereby preventing information to analyze the access-limited character train and its password from being given to the user.

First, when the search conditions are inputted (step S31), one inputted search word (password) is read out (step S32). A check is made to see if the read-out search word is a search word by "access-limited character train+password designation" (step S33). When it is not the search word by "access-limited character train+password designation", the search word is searched from the full text and a search result is stored (step S34).

When the read-out search word is the search word by "access-limited character train+password designation", a check is made to see if it is the access-limited character train from the access-limited character train management information table (step S35). When it is the access-limited character train, a check is made to see if the password coincides (step S36). When the password coincides, the search word is searched from the full text and a search result is stored (step S37). When the read-out search word is not the access-limited character train or when the password does not coincide, conditions are set for a subsequent logical operation, which will be explained hereinlater (step S38).

A check is made to see if there are any other search words which are not yet processed (step S39). If there are un-processed search words, the processing routine is returned to the process in step S32. When there is no un-processed search word, the full-text search result for each search word is calculated by the designated logical operation (step S40). The logical operation in the portion where the access-limited character train and the password are erroneously designated is processed as an invalid operation.

The presence or absence of the target document is discriminated (step S41). When the target document does not exist, a message indicating that the hit was not performed is returned (step S42). When the target document exists, the OR of the search results of the access-limited character trains appearing this time in the search word with the same password is calculated (step S43). The OR of search results of the access-limited character train which does not appear this time in the search word and the access-limited character train in which the password does not coincide although it appears this time in the search word is calculated (step S44).

The AND of processing results in steps S43 and S44 is calculated (step S45). The AND of processing results in steps S41 and S44 is calculated (step S46). The OR of processing results in steps S45 and S46 is calculated, thereby obtaining the number of hits which may be soon shown (step S47). The AND of the processing results in steps S43 and S44 is calculated, thereby obtaining the number of hits including the access-limited character train (step S48).

The number of hits in which a processing result in step S48 is added to a processing result in step S47 is returned. However, with respect to the processing result in step S48, words of "access-limited document" are added to the number of hits and resultant data is returned and, with regard to the processing result in step S47, an attribute such as a title or the like is added to the number of hits and resultant data is returned (step S49).

Figure 11:
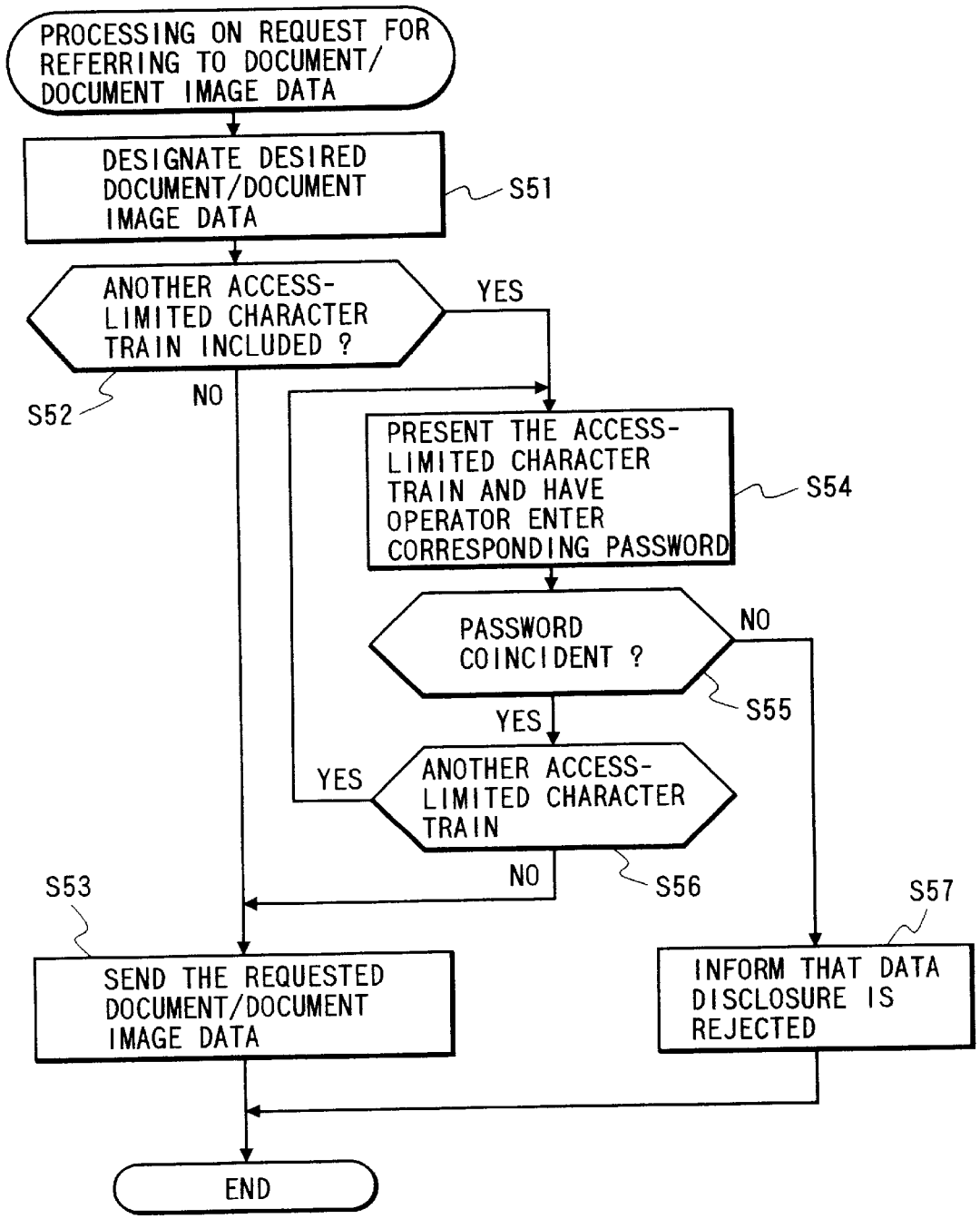
FIG. 11 is a flowchart showing a processing procedure in the case where the user refers to the document/document image data from a search result.

FIG. 11 is a flowchart showing a processing procedure in the case where the user refers to the document/document image data from the search result. First, the data to be referred to in the document/document image data is instructed from the client terminal 12 (step S51). Whether any other access-limited character train is included or not is discriminated (step S52). When any other access-limited character train is not included, the designated document/document image data is transmitted (step S53).

Figure 8:
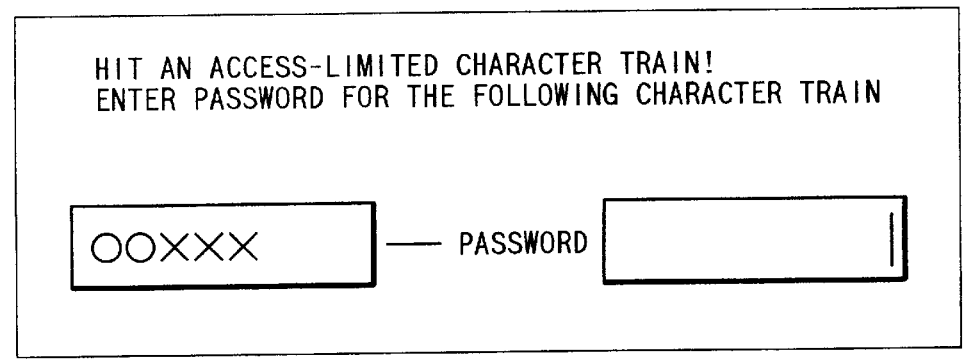
FIG. 8 is a diagram showing the picture plane for entering password for a hit document including a plurality of access-limited character trains.

On the other hand, when the other access-limited character train is included in step S52, the included access-limited character train is represented and its password is inputted (step S54, refer to FIG. 8). A check is made to see if the inputted password coincides (step S55). If YES, a check is made to see if there is any other access-limited character train (step S56). If there is any other access-limited character train, the processing routine is returned to step S54. If there is no other access-limited character train, step S53 follows.

When the inputted password does not coincide in step S55, a message that the data disclosure is refused is notified (step S57).

There are mainly two kinds of search processing results. One of them relates to a case where among the documents which were hit by the search word that is not the access-limited character train and the documents in which the access-limited character train was selected as a search word and the correct password was given, the other access-limited character trains are not included in the document. The other relates to the case where among the documents in which the access-limited character train was selected as a search word and the correct password was given, the other access-limited character trains are included in the document.

When referring to the document/document image data, the hit document data can be also transmitted in a lump in the former case. In the latter case, however, after the access-limited character trains and the passwords were individually asked and the conditions were satisfied as will be explained hereinlater, the document/document image data is referred to. In the former case, the attribute information such as the number of hits, document title, and the like is notified. In the latter case, only the attribute information such that even if it is presented, there will be no problem is notified. Only the necessary data can be also transmitted in accordance with a request of the application of the client terminal 12.

In the latter case, a question dialog is presented to the document including a plurality of other access-limited character trains. FIG. 8 is a diagram showing a picture plane for inputting the password to a hit document including a plurality of access-limited character trains. The access-limited character trains are sequentially presented and when all of the correct passwords are inputted, it is enabled to refer to the document data. However, when the password is erroneously designated in the middle of the operation, the document data cannot be referred to at this time point.

When the FTS server 7 has a function to store the search word designated from the client terminal 12 into a thesaurus (synonym), a check is made to see if the access-limited character train is not included in the thesaurus storage result. When it is included, a process to invalidate the thesaurus which coincides with the access-limited character train is executed.

In the embodiment, the access is limited to the character train image included in the document image data. However, the access can be also limited by the character train to the key word, symbol train, and encryption indicative of the contents and secrecy degree instead of the character train image. It is also possible to operate in a manner such that the user uses Internet Browser and executes processes on a home page.

Figure 12:
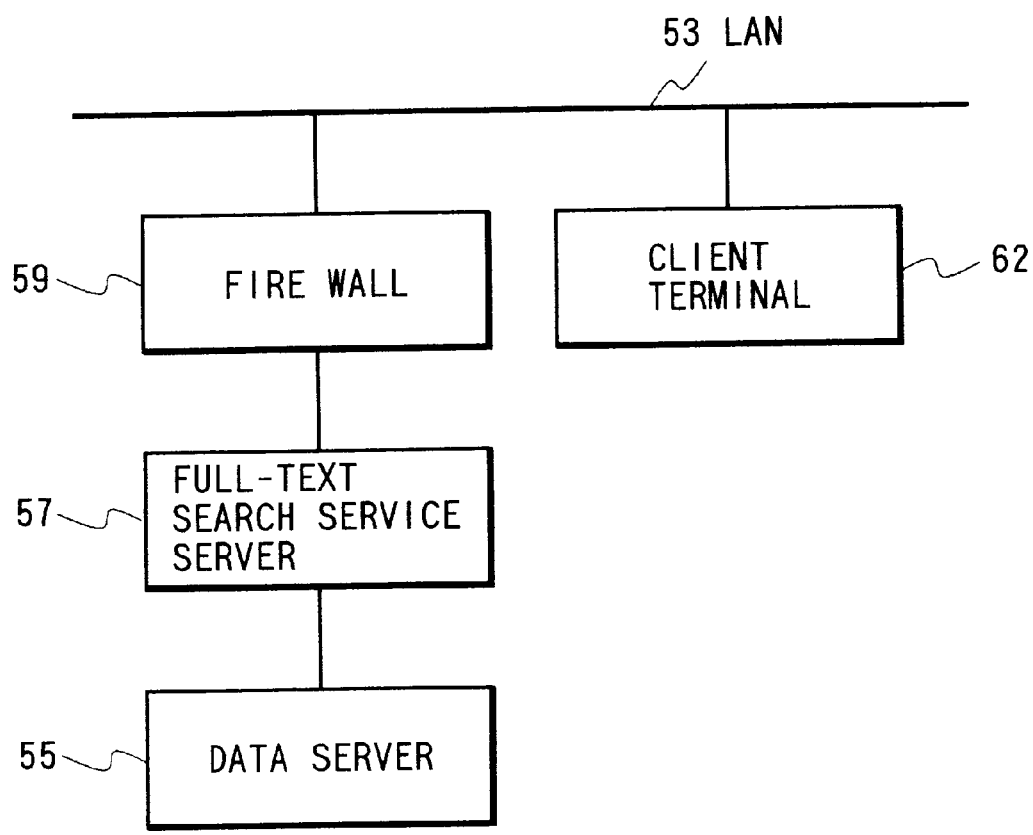
FIG. 12 is a block diagram showing a construction of another document management system.

Further, in the embodiment, although the fire wall 9 has been provided between the FTS server 7 and data server 5 in order to prevent the direct access from the LAN 3 to various data, the fire wall 9 can be also provided at another location. FIG. 12 is a block diagram showing a construction of another document security management system. In the document security management system, a fire wall 59 is directly connected to an LAN 53 and a full-text search service (FTS) server 57 and a data server 55 are provided behind the fire wall 59. It is sufficient that the FTS server 57 and data server 55 are serially connected from the side near the LAN 53. In this case, a client terminal 62 on the LAN 53 which can pass through the fire wall 59 is limited. Although the construction shown in FIG. 1 is more preferable for the purpose of security, the construction shown in FIG. 12 has a larger flexibility in operation because the client terminal which can be accessed is limited.

Further, whether the data server relates to a packet from the FTS server or not is discriminated. When it is not the packet from the FTS server, if the data server has a function which makes it impossible to refer to an internal file, it is not always necessary to provide the fire wall.

By applying the invention to a data sharing management system through a network such as internet, intranet, or the like which is being progressed in recent years, security can be assured by a character train included in the accumulated document instead of simple security by the access right.

Further, even in a data management system of a stand-along type which does not intervene the network, a concept that the access is limited by the character train included in the document can be used.

According to the document management system of the invention, when the document search service server searches the document accumulated in the data server in accordance with the character train designated from the client terminal, the access-limited character train and its password are set by the setting means. At the time of the search, if the access-limited character train and its password are not designated from the client terminal, the access to the document including the access-limited character train is inhibited by the inhibiting means. Therefore, it is possible to flexibly cope with the access right range of the secret document while efficiently sharing the document data. It is also possible to flexibly cope with the operation when secrecy is lost and the document data is publicly disclosed.

According to the document management system of the invention, since the fire wall is provided between the document search service server and the data server, in the case where the system does not have the function such that whether the data server indicates the packet from the FTS server or not is discriminated and, when it is not the packet from the FTS server, it makes it impossible to refer to the internal file or the like, it is possible to prevent that the data server is directly accessed from the client terminal. The document security can be improved.

According to the document management system of the invention, since the table of the access-limited character trains and their passwords has been stored in the data server, the security can be raised.

According to the document management system of the invention, since the IP addresses of the persons who requested the registration of the access-limited character trains and their registration have been stored in the table, the IP addresses of the registration requesters can be easily managed. It is possible to easily confirm when the access-limited character trains and their passwords are deleted.

According to the document management system of the invention, when there is a deletion request from the person who requested the registration or when there are deletion requests of a predetermined number or more from the persons having different IP addresses, the access-limited character train is deleted from the table. Therefore, it is possible to eliminate a fear such that the secret document is erroneously publicly disclosed.

According to the document management system of the invention, the display device for displaying the search results is provided and, when the access-limited character train is included in the searched document, the display device displays the picture plane to request to input the password to the access-limited character train, so that the operability can be improved.

According to the document management system of the invention, when the document is the image data, the data server converts the image data to the text data by the OCR process and the converted text data in correspondence to the image data. Therefore, processes similar to those for the text data can be executed to the image data.

According to the document management system of the invention, when the searched document does not include the access-limited character train, the document search service server adds the attributes to the searched document and notifies the client terminal of the search result. Therefore, when the document is not the secret document, much information for the search result can be notified to the user.

According to the document management system of the invention, since the fire wall is provided between the network and the document search service server, the client terminal on the network which can pass through the fire wall is limited. Therefore, the flexibility of the operation can be raised by an amount in which the client terminal which can access is limited.

What is claimed is:

1. A document management system comprising:
    a document search service server connected to a client terminal through a network; and
    a data server, connected to said network through said document search service sever, for accumulating documents,
        in which said document search service server searches said documents accumulated in said data server in accordance with a character train designated from said client terminal,
        wherein said document search service server has:
            setting means for setting an access-limited character train and its password;
            discriminating means for discriminating whether a search character train of a document includes the access-limited character train;
    password-discriminating means for discriminating whether the password of the access-limited character train is proper, when said discriminating means discriminates that the search character train includes the access-limited character train; and inhibiting means for inhibiting an access to the document including said access-limited character train at the time of a search when said password-discriminating means discriminates that the password of said access-limited character train is not proper.

2. A system according to claim 1, wherein a fire wall is provided between said document search service server and said data server.

3. A system according to claim 1, wherein a table of said access-limited character train and its password has been stored in said data server.

4. A system according to claim 3, wherein IP addresses of persons who requested a registration of said access-limited character train and the password have been stored in said table.

5. A system according to claim 4, wherein when there is a deletion request from the person who requested said registration or when there are deletion requests of a predetermined number or more from the persons who have different IP addresses, said access-limited character train is deleted from said table.

6. A system according to claim 1, further having a display device for displaying a search result, and wherein when said access-limited character train is included in said searched document, a picture plane to request to input the password for said access-limited character train is displayed.

7. A system according to claim 1, wherein when said document is image data, said data server converts said image data into text data by an OCR process and accumulates said converted text data in correspondence to said image data.

8. A system according to claim 1, wherein when said searched document does not include said access-limited character train, said document search service server adds an attribute to said searched document and notifies said client terminal of a search result.

9. A system according to claim 1, wherein a fire wall is provided between said network and said document search service server.

10. A document managing method in a document management system comprising:

a document search service server connected to a client terminal through a network; and a data server, connected to the network through the document search service server, for accumulating documents, in which the document search service server searches the documents accumulated in the data server in accordance with a character train designated from the client terminal, comprising the steps of:

setting an access-limited character train and its password;

discriminating whether a search character train of a document includes the access-limited character train;

password-discriminating whether the password of the access-limited character train is proper, when said discriminating step discriminates that the search character train includes the access-limited character train; and inhibiting an access to the document including the access-limited character train at the time of the search when said password-discriminating step discriminates that the password of the access-limited character train is not proper.

11. A document management apparatus comprising:

setting means for setting an access-limited character train to a document and its password;

discriminating means for discriminating whether a search character train of a document includes the access-limited character train;

password-discriminating means for discriminating whether the password of the access-limited character train is proper, when said discriminating means discriminates that the search character train includes the access-limited character train; and inhibiting means for inhibiting an access to the document including the access-limited character train, when said password-discriminating means discriminates that the password of the access-limited character train is not proper.

12. A document management apparatus according to claim 11, further including a table of the access-limited character train and its password.

13. A document management apparatus according to claim 12, wherein IP addresses of persons who requested a registration of the access-limited character train have been stored in said table.

14. A document management apparatus according to claim 11, further comprising output means for outputting the document as a search result, when said password-discriminating means discriminates that the password of the access-limited character train is proper.

15. A document management apparatus according to claim 14, further comprising password requesting means for requesting an input of the password to the access-limited character train, when a document among documents outputted by said output means is requested to be displayed as a document image and the document includes the access-limited character train.

16. A document management apparatus according to claim 14, wherein when there is a deletion request from the person who requested said registration or when there are deletion requests of a predetermined number of more from persons who have different IP addresses, said access-limited character train is deleted from said table.

17. A document management apparatus according to claim 11, further comprising indicating means for indicating the document including the search character train as a search result of performing a full-text search about the search character train, when said discriminating means discriminates that the search character train does not include the access-limited character train.

18. A document management apparatus according to claim 11, wherein said access-limited character train is a character train included in the document.

19. A document management method comprising:

a setting step for setting an access-limited character train to a document and its password;

a discriminating step for discriminating whether a search character train of a document includes the access-limited character train;

a password-discriminating step for discriminating whether the password of the access-limited character train is proper, when said discriminating step discriminates that the search character train includes the access-limited character train; and an inhibiting step for inhibiting an access to the document including the access-limited character train, when said password-discriminating step discriminates that the password of the access-limited character train is not proper.

20. A document management method according to claim 19, further including a step of forming a table of the access-limited character train and its password.

21. A document management method according to claim 20, wherein IP addresses of persons who requested a registration of the access-limited character train have been stored in said table.

22. A document management step according to claim 19, further comprising an output step for outputting the document as a search result, when said password-discriminating step discriminates that the password of the access-limited character train is proper.

23. A document management method according to claim 22, further comprising a password requesting step for requesting an input of the password to the access-limited character train, when a document among documents outputted by said output step is requested to be displayed as a document image and the document includes the access-limited character train.

24. A document management method according to claim 22, wherein when there is a deletion request from the person who requested said registration or when there are deletion requests of a predetermined number of more from persons who have different IP addresses, said access-limited character train is deleted from said table.

25. A document management method according to claim 19, further comprising an indicating step for indicating the document including the search character train as a search result of performing a full-text search about the search character train, when said discriminating step discriminates that the search character train does not include the access-limited character train.

26. A document management method according to claim 19, wherein said access-limited character train is a character train included in the document.

27. A computer-readable medium for storing program codes to perform a document management method comprising the steps of:

a setting step for setting an access-limited character train to a document and its password;

a discriminating step for discriminating whether a search character train of a document includes the access-limited character train;

a password-discriminating step for discriminating whether the password of the access-limited character train is proper, when said discriminating step discriminates that the search character train includes the access-limited character train; and an inhibiting step for inhibiting an access to the document including the access-limited character train, when said password-discriminating step discriminates that the password of the access-limited character train is not proper.

28. A medium according to claim 27, wherein the codes further include a step of forming a table of the access-limited character train and its password.

29. A medium according to claim 28, wherein IP addresses of persons who requested a registration of the access-limited character train have been stored in said table.

30. A medium according to claim 27, further comprising codes for an output step for outputting the document as a search result, when said password-discriminating step discriminates that the password of the access-limited character train is proper.

31. A medium according to claim 30, further comprising codes for a password requesting step for requesting an input of the password to the access-limited character train, when a document among documents outputted by said output step is requested to be displayed as a document image and the document includes the access-limited character train.

32. A medium according to claim 30, wherein when there is a deletion request from the person who requested said registration or when there are deletion requests of a predetermined number of more from persons who have different IP addresses, said access-limited character train is deleted from said table.

33. A medium according to claim 27, further comprising codes for an indicating step for indicating the document including the search character train as a search result of performing a full-text search about the search character train, when said discriminating step discriminates that the search character train does not include the access-limited character train.

34. A medium according to claim 27, wherein said access-limited character train is a character train included in the document.

* * * * *

UNITED STATES PATENT AND TRADEMARK OFFICE
CERTIFICATE OF CORRECTION

PATENT NO. : 6,128,616
DATED : October 3, 2000
INVENTOR(S) : Hirotaka Shiiyama

It is certified that error appears in the above-identified patent and that said Letters Patent is hereby corrected as shown below:

Sheet 7:
FIG. 9, Block S31, "SERCH" should read --SEARCH--.

Column 3:
Line 34, "comparing" should read --comparing it--.

Column 6:
Line 50, "information such that even if it is presented, there will be no problem" should read --information, such that even if it is presented there will be no problem,--.

Column 7
Line 41, "intervene" should read --intervene in--.
Line 66, "is" should read --be--, and "The" should read --Therefore the--.

Column 10-12
Claim 11 to 34 should be deleted.

Signed and Sealed this

Nineteenth Day of June, 2001

Attest:

NICHOLAS P. GODICI
Attesting Officer    Acting Director of the United States Patent and Trademark Office